(12) United States Patent (10) Patent No.: US 12,680,439 B2

Raglin (45) **Date of Patent: \*Jul. 14, 2026**

(54) SAND AND SOLIDS BYPASS SEPARATOR

(71) Applicant: WellWorx Energy Solutions LLC, Midland, TX (US)

(72) Inventor: John M. Raglin, Midland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,321

(22) Filed: Sep. 28, 2023

(65) Prior Publication Data

US 2024/0018862 A1 Jan. 18, 2024

Related U.S. Application Data

(63) Continuation of application No. 17/548,864, filed on Dec. 13, 2021, now Pat. No. 11,773,708, which is a continuation of application No. 16/827,129, filed on Mar. 23, 2020, now Pat. No. 11,199,080, which is a continuation of application No. 16/438,074, filed on Jun. 11, 2019, now Pat. No. 10,605,064.

(51) Int. Cl.
| | |
|---|---|
| *E21B 43/34* | (2006.01) |
| *B01D 33/27* | (2006.01) |
| *E21B 43/38* | (2006.01) |

(52) U.S. Cl.
CPC ............ *E21B 43/35* (2020.05); *B01D 33/275* (2013.01); *E21B 43/38* (2013.01); *B01D 2221/04* (2013.01)

(58) Field of Classification Search
CPC .... E21B 43/38; B01D 33/275; B01D 2221/04
See application file for complete search history.

(56) References Cited

U.S. PATENT DOCUMENTS

| | | | | |
|---|---|---|---|---|
| 1,741,497 | A | * 12/1929 | Boltz | ...................... E21B 27/04 |
| | | | | 175/323 |
| 3,128,719 | A | * 4/1964 | Jongbloed | ............... E21B 43/38 |
| | | | | 166/105.5 |
| 3,289,608 | A | * 12/1966 | Laval, Jr. | ................ E21B 43/35 |
| | | | | 55/455 |

(Continued)

FOREIGN PATENT DOCUMENTS

| | | | | |
|---|---|---|---|---|
| CA | 2301525 | A1 * | 3/1999 | ......... B01D 21/2444 |
| CA | 2885571 | A1 * | 5/2015 | ......... B01D 19/0042 |

(Continued)

*Primary Examiner* — Jennifer H Gay

(74) *Attorney, Agent, or Firm* — Bell Nunnally & Martin LLP

(57) ABSTRACT

A sand bypass separator is provided for separating particulate matter from a fluid mixture in a production well and directing the separated particulate matter away from a pump intake. The separator includes an outer tube, an inner tube positioned within the outer tube. The outer tube has a plurality of slots to allow the fluid mixture to enter the separator between the outer tube and the inner tube. As the fluid mixture moves downward, the fluid mixture reaches a downward velocity sufficient to allow the particulate matter in the fluid mixture to continue downward as the fluid is drawn into the inner tube through the pump intake. A bypass that extends from above the pump intake to below the pump intake to collect and direct the separated particulate matter separated below the pump intake may also be included.

20 Claims, 4 Drawing Sheets

(56)                References Cited

U.S. PATENT DOCUMENTS

| | | | | |
|---|---|---|---|---|
| 5,295,537 | A | 3/1994 | Trainer | |
| 5,314,018 | A * | 5/1994 | Cobb | B01D 21/267 |
| | | | | 166/105.1 |
| 5,553,669 | A * | 9/1996 | Trainer | B01D 29/48 |
| | | | | 166/105.1 |
| 5,653,286 | A * | 8/1997 | McCoy | E21B 43/38 |
| | | | | 166/105.5 |
| 5,662,167 | A * | 9/1997 | Patterson | B01D 21/0003 |
| | | | | 166/105.1 |
| 5,810,081 | A * | 9/1998 | Cobb | E21B 17/00 |
| | | | | 166/105.3 |
| 6,036,749 | A * | 3/2000 | Ribeiro | B01D 21/2444 |
| | | | | 96/216 |
| 6,394,183 | B1 * | 5/2002 | Schrenkel | E21B 43/38 |
| | | | | 166/105.4 |
| 6,564,865 | B1 * | 5/2003 | Brady | E21B 43/385 |
| | | | | 166/266 |
| 8,056,622 | B2 * | 11/2011 | Lynde | E21B 37/00 |
| | | | | 166/105.3 |
| 8,109,331 | B2 * | 2/2012 | Lynde | E21B 37/00 |
| | | | | 166/105.3 |
| 8,210,251 | B2 * | 7/2012 | Lynde | E21B 23/14 |
| | | | | 166/66.4 |
| 8,584,744 | B2 * | 11/2013 | Soni | E21B 27/04 |
| | | | | 175/323 |
| 8,960,282 | B2 * | 2/2015 | Zhu | E21B 37/00 |
| | | | | 166/107 |
| 9,353,614 | B2 * | 5/2016 | Roth | B01F 25/43141 |
| 9,771,786 | B2 * | 9/2017 | Raglin | E21B 43/35 |
| 10,107,088 | B2 * | 10/2018 | Stachowiak | E21B 43/38 |
| 10,260,324 | B2 * | 4/2019 | Muraikhi | E21B 43/38 |
| 10,605,064 | B1 * | 3/2020 | Raglin | B01D 33/275 |
| 10,934,828 | B2 | 3/2021 | Downing | |
| 11,199,080 | B2 * | 12/2021 | Raglin | E21B 43/35 |
| 11,466,553 | B2 * | 10/2022 | Raglin | B01D 33/275 |
| 11,773,708 | B2 * | 10/2023 | Raglin | B01D 33/275 |
| | | | | 166/265 |
| 2002/0134554 | A1 * | 9/2002 | Schrenkel | E21B 43/38 |
| | | | | 166/372 |
| 2003/0089505 | A1 * | 5/2003 | Pluchek | E21B 27/005 |
| | | | | 166/135 |
| 2003/0196952 | A1 * | 10/2003 | Kampfen | B01D 21/267 |
| | | | | 210/512.3 |
| 2010/0258296 | A1 * | 10/2010 | Lynde | E21B 37/00 |
| | | | | 166/105.1 |
| 2010/0258297 | A1 * | 10/2010 | Lynde | E21B 37/00 |
| | | | | 166/105.1 |
| 2013/0032352 | A1 * | 2/2013 | Raglin | E21B 43/35 |
| | | | | 166/227 |
| 2015/0211349 | A1 * | 7/2015 | Raglin | E21B 43/35 |
| | | | | 166/105.3 |
| 2015/0233228 | A1 * | 8/2015 | Roth | E21B 43/122 |
| | | | | 166/372 |
| 2016/0251951 | A1 * | 9/2016 | Stachowiak | E21B 43/38 |
| | | | | 166/265 |
| 2019/0106973 | A1 * | 4/2019 | Ayub | E21B 43/128 |
| 2019/0234193 | A1 * | 8/2019 | Fehri | E21B 43/128 |
| 2019/0368311 | A1 * | 12/2019 | Krawiec | E21B 43/127 |
| 2020/0308950 | A1 | 10/2020 | Fires | |
| 2020/0392828 | A1 * | 12/2020 | Raglin | B01D 33/275 |
| 2022/0098966 | A1 * | 3/2022 | Raglin | E21B 43/38 |
| 2024/0018862 | A1 * | 1/2024 | Raglin | B01D 33/275 |

FOREIGN PATENT DOCUMENTS

| | | | | |
|---|---|---|---|---|
| CN | 103790566 | 5/2014 | | |
| SU | 1629507 | 2/1991 | | |
| WO | WO-2016134312 A1 * | 8/2016 | | E21B 43/121 |

* cited by examiner

100

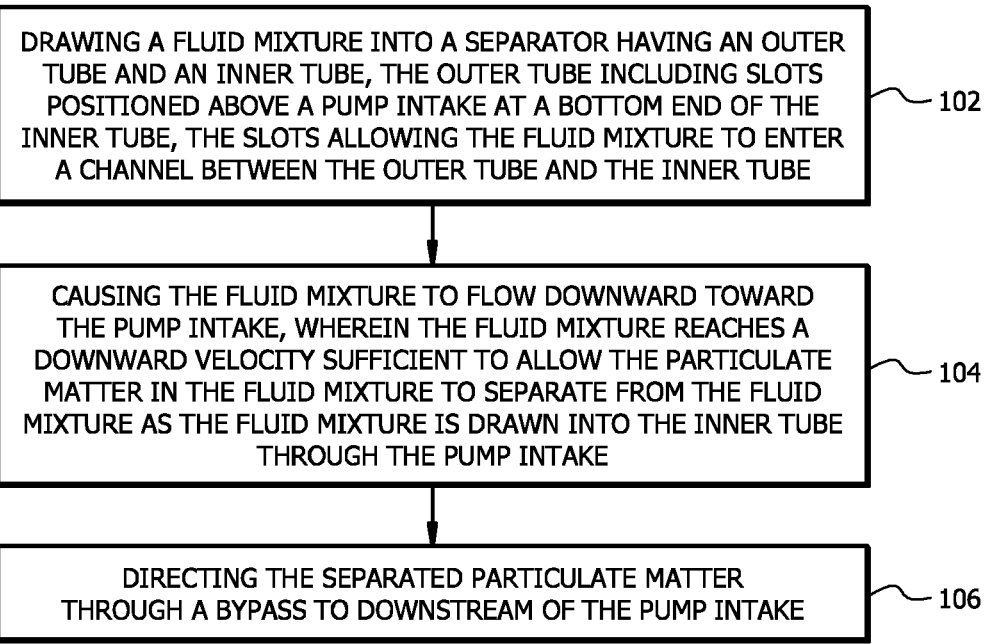

DRAWING A FLUID MIXTURE INTO A SEPARATOR HAVING AN OUTER TUBE AND AN INNER TUBE, THE OUTER TUBE INCLUDING SLOTS POSITIONED ABOVE A PUMP INTAKE AT A BOTTOM END OF THE INNER TUBE, THE SLOTS ALLOWING THE FLUID MIXTURE TO ENTER A CHANNEL BETWEEN THE OUTER TUBE AND THE INNER TUBE          102

CAUSING THE FLUID MIXTURE TO FLOW DOWNWARD TOWARD THE PUMP INTAKE, WHEREIN THE FLUID MIXTURE REACHES A DOWNWARD VELOCITY SUFFICIENT TO ALLOW THE PARTICULATE MATTER IN THE FLUID MIXTURE TO SEPARATE FROM THE FLUID MIXTURE AS THE FLUID MIXTURE IS DRAWN INTO THE INNER TUBE THROUGH THE PUMP INTAKE          104

DIRECTING THE SEPARATED PARTICULATE MATTER THROUGH A BYPASS TO DOWNSTREAM OF THE PUMP INTAKE          106

*FIG. 6*

SAND AND SOLIDS BYPASS SEPARATOR

CROSS REFERENCE TO RELATED INFORMATION

This application is a continuation of U.S. patent application Ser. No. 17/548,864, filed Dec. 13, 2021, titled Sand and Solids Bypass Separator, now U.S. Pat. No. 11,773,708; which is a continuation of Ser. No. 16/827,129, filed Mar. 23, 2020, titled Sand and Solids Bypass Separator, now U.S. Pat. No. 11,199,080; which is a continuation of U.S. patent application Ser. No. 16/438,074, filed Jun. 11, 2019, titled Sand and Solids Bypass Separator, now U.S. Pat. No. 10,605,064, the contents of which are hereby incorporated herein in its entirety.

TECHNICAL FIELD

The present disclosure is directed to an apparatus and method for petroleum producing and injection wells and more particularly to the separation of particulates, such as sand, from a hydrocarbon production stream.

BACKGROUND OF THE INVENTION

Petroleum wells can be naturally flowing, injecting or can be produced by any means of artificial lift. For instance, referring to FIG. 1, a diagram of a typical sucker rod pump used as an artificial lift in oil wells is described. Well (10) may include a well bore (11) and a pump assembly (12). Pump assembly (12) may be formed by a motor (13) that supplies power to a gear box (14). Gear box (14) is operable to reduce the angular velocity produced by motor (13) and to increase the torque relative to the input of motor (13). The input of motor (13) may be used to turn crank (15) and lift counterweight (16). As crank (15) is connected to walking beam (17) via pitman arm (18), walking beam (17) may pivot and submerge plunger (19) in well bore (11) using bridle (20) connected to walking beam (18) by horse head (21). Walking beam (17) may be supported by sampson post (22).

As shown in FIGS. 1-2, well bore (11) may include casing (23) and tubing (24) extending inside casing (23). Sucker rod (25) may extend through the interior of tubing (24) to plunger (19). At the bottom of well bore (11), in oil bearing region (26), casing (23) may include perforations (27) that allow hydrocarbons and other material to enter annulus (28) between casing (23) and tubing (24). Well products may collect around pump barrel (29), which contains standing valve (30), as shown in FIGS. 3A-3B. Plunger (19) may include traveling valve (31). During the down stroke of the plunger (FIG. 3B), traveling valve (31) may be opened and product in the pump barrel (29) may be forced into the interior of tubing (24). When the pump begins its upstroke (FIG. 3A), traveling valve (31) may be closed and the material in the tubing may be forced up the tubing by the motion of plunger (19). Also, during the upstroke, standing valve (30) may be opened and material may flow from the annulus in the oil-bearing region and into the pump barrel.

The products within the well bore can include liquid and gaseous products, as well as particulates such as sand, silt, and other solids that are both naturally occurring and manmade. As hydrocarbons and water flow through the formation, these particulates are carried in the flow stream and can be carried into the production tubing, which can cause problems with the tubing and/or the artificial lifting mechanism.

With an increase in fracturing of wells designed to increase the well's production, there has been an increase in fracture sand, the most common manmade particulate found at the wellhead. Fracture sand is commonly introduced into the reservoir in an effort to create conductive channels from the reservoir rock into the wellbore, thereby allowing the hydrocarbons a much easier flow path into the tubing and up to the surface of the well.

Natural or manmade particulates can cause a multitude of producing problems for oil and gas operators. For example, in flowing wells abrasive particulates can "wash through" metals in piping, creating leaks and potentially hazardous conditions. Particulates can also fill-up and stop-up surface flow lines, vessels, and tanks. In reservoirs whereby some type of artificial lift is required such as rod pumping, electric submersible pumps, progressive cavity, and other methods, production of particulates can reduce the life of the down-hole assembly and/or increase maintenance costs.

BRIEF SUMMARY OF THE INVENTION

A particulate separator is provided such that the separator may be positioned within a casing of a wellbore of a hydrocarbon production well to separate particulate matter from a fluid mixture and direct the separated particulate matter away from a pump intake of an artificial lift to thereby inhibit the particulate matter from entering the pump intake, which may increase the efficiency and/or the service life of the downhole assembly.

In one embodiment, a particulate separator for use with a production well producing a fluid mixture including particulate matter may comprise: an outer tube comprising a closed top end, an open bottom end, and a conduit extending therethrough, wherein the outer tube comprises a plurality of slots extending from an exterior surface of the outer tube to the conduit; an inner tube positioned within the conduit of the outer tube, wherein the inner tube comprises a pump intake at a bottom end of the inner tube positioned below the plurality of slots of the outer tube, the plurality of slots allowing the fluid mixture to enter a channel between the outer tube and the inner tube and to flow downward toward the pump intake, wherein the fluid mixture reaches a downward velocity sufficient to allow the particulate matter in the fluid mixture to continue downward as the fluid is drawn into the inner tube through the pump intake.

A method for separating particulate matter from a fluid mixture for use with a production well may comprise: drawing a fluid mixture into a separator having an outer tube and an inner tube, the outer tube including slots positioned above a pump intake at a bottom end of the inner tube, the slots allowing the fluid mixture to enter a channel between the outer tube and the inner tube; causing the fluid mixture to flow downward toward the pump intake, wherein the fluid mixture reaches a downward velocity sufficient to allow the particulate matter in the fluid mixture to separate from the fluid mixture as the fluid mixture is drawn into the inner tube through the pump intake; and directing the separated particulate matter to downstream of the pump intake.

In another embodiment, a sand separator for removing particulate matter from a fluid in a production well may comprise: an outer tube comprising a closed top end, an open bottom end, and a conduit extending therethrough, wherein the outer tube comprises a plurality of slots extending from an exterior surface of the outer tube to the conduit, wherein the plurality of slots are configured to allow the fluid within a wellbore to enter the outer tube; an inner tube positioned within a top portion of the conduit of the outer tube, wherein the inner tube comprises a fin extending outwardly and downwardly about the inner tube below the plurality of slots of the outer tube, wherein the fin is configured to direct the fluid radially downward to aid in the removal of particulate matter from the fluid, wherein the inner tube comprises a pump intake at a bottom end of the inner tube positioned below the fin, wherein the fluid is drawn into the inner tube through the pump intake; and a bypass extending from above the fin to below the pump intake, wherein the bypass is configured to direct the separated particulate matter to below the pump intake to thereby inhibit the particulate matter separated from the fluid mixture from entering the pump intake.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 6 depicts a schematic of a method of operating the separator of FIG. 4.

DETAILED DESCRIPTION OF THE INVENTION

A sand bypass separator for a hydrocarbon producing well provides mechanisms for both reducing the amount of sand or other solid particulates entrained in a fluid mixture of a gaseous and/or liquid product and separating that sand from the mixture. A centrifugal effect is used to convey sand to a bottom and outside portion of a vortex, where the sand may be collected and discharged below a pump intake for an artificial lift. For instance, a helical fin may be used to create a vortex and direct the sand into a bypass. The bypass may then discharge the sand below the pump intake, where it can fall freely into a mud anchor. This may provide a more effective method to separate and move sand away from the pump intake to increase the life of the down-hole assembly and/or decrease maintenance costs. Any type of artificial lift applicable to any producing oil well may be used, such as a sucker rod pump, rod pumping, electric submersible pumps, progressive cavity, and other methods.

Figure 1:
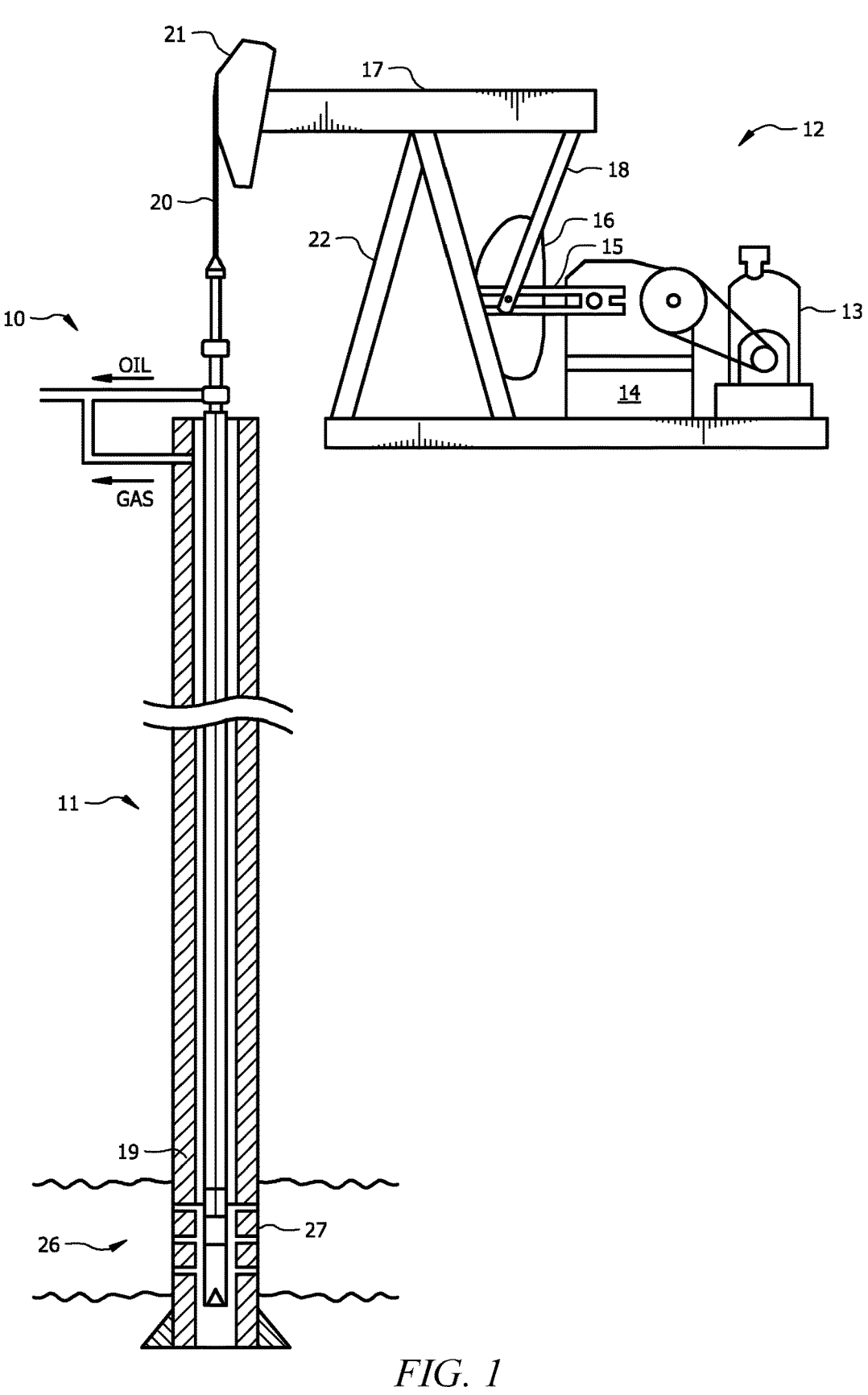
FIG. 1 depicts a diagram of a prior art petroleum producing well showing an existing sucker rod pump assembly to provide artificial lift.
Figure 2:
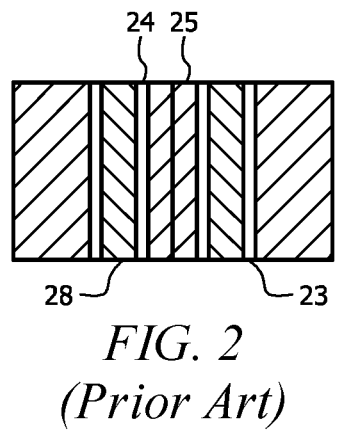
FIG. 2 depicts a sectional view of the well string shown in FIG. 1.
Figure 3A:
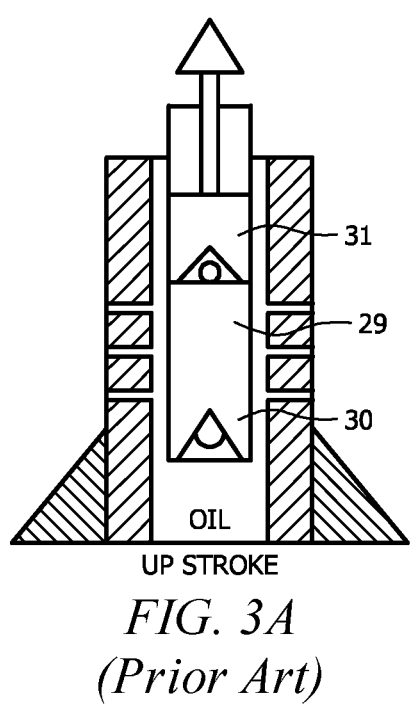
FIG. 3A depicts a detail view of the plunger portion of the well of FIG. 1 showing the up stroke.
Figure 3B:
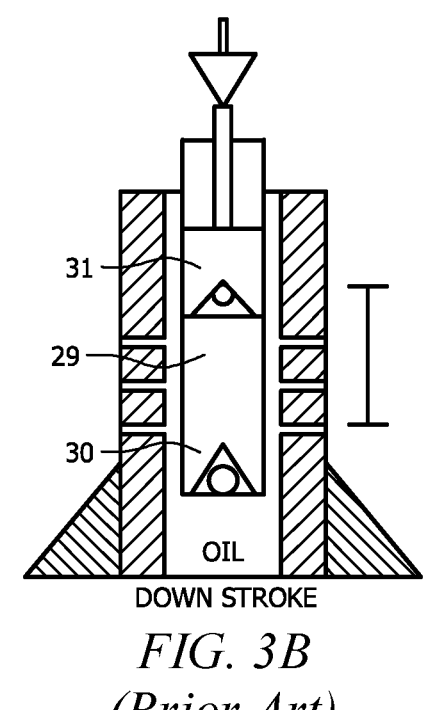
FIG. 3B depicts a detail view of the plunger portion of the well of FIG. 1 showing the down stroke.
Figure 4:
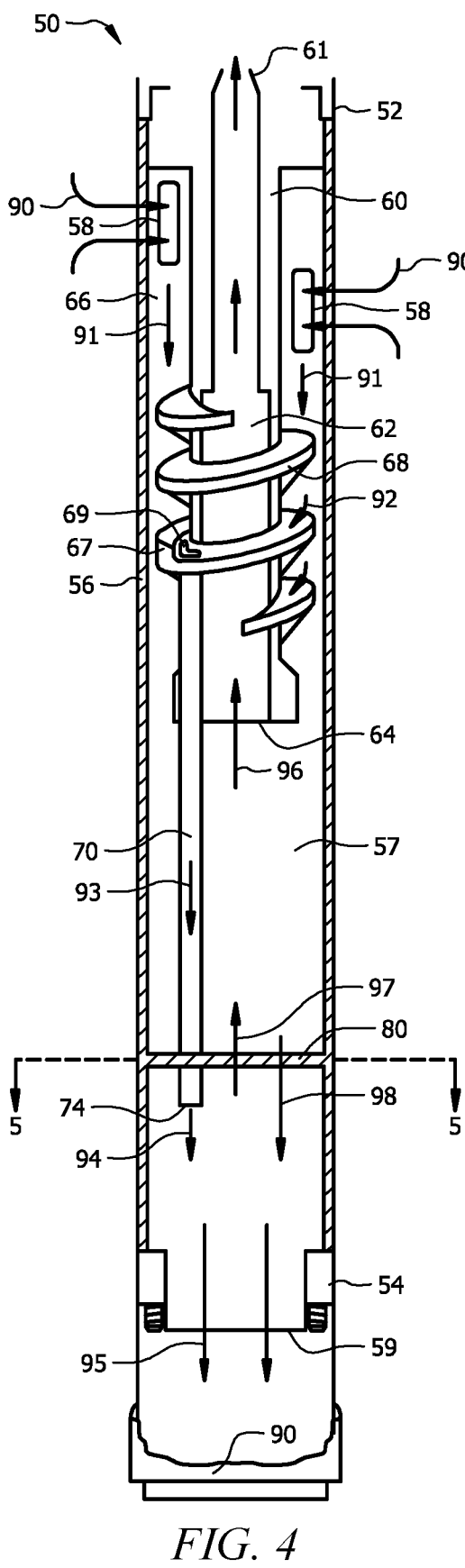
FIG. 4 depicts a cross-sectional view of an exemplary embodiment of a sand bypass separator for use within a petroleum producing well.

Referring now to FIG. 4, a sand bypass separator (50) is shown for use in a hydrocarbon producing well to inhibit sand or other solid particulates from entering a pump intake of an artificial lift. The separator (50) comprises an outer tube (56), an inner tube (60), and a bypass (70). The outer tube (56) has a closed top end (52), an open bottom end (59), and a conduit (57) extending therethrough. A top portion of the outer tube (56) comprises a plurality of slots (58) extending from an exterior surface of the outer tube (56) to the interior surface of the outer tube (56). The slots (58) may have an oval shape, or any other suitable shape, such as rectangular, circular, square, etc. A production fluid mixture is thereby configured to flow into the separator (50) via the slots (58). In the illustrated embodiment, the outer tube (56) has a generally tubular shape, but any other suitable shapes may be used.

The separator (50) further comprises an inner tube (60) positioned concentrically within the outer tube (56). The inner tube (60) includes a top end (61), a bottom end (64), and a conduit (62) extending therethrough. The inner tube (60) may be coupled with a pump of an artificial life such that production fluid may enter the bottom end (64), or pump intake, of the inner tube (60), flow through the conduit (62), and exit the inner tube (60) at the top end (61) to be directed to the pump. The inner tube (60) has a generally tubular shape, but any other suitable shapes may be used. In the illustrated embodiment, the inner tube (60) extends downwardly from a top portion of the outer tube (56) and has a smaller length than the outer tube (56). Accordingly, a channel (66) is formed between the outer tube (56) and the inner tube (60) at a top portion of the outer tube (56). The inner tube (60) further comprises a helical fin (68) extending outward from the inner tube (60) to an interior surface of the outer tube (56). Fin (68) may be a continuous fin or a series of fins. Fin (68) is positioned downstream of the plurality of slots (58) of the outer tube (56) such that the production fluid mixture may flow through the slots (58), into channel (66), and downward to fin (68). The fin (68) may thereby direct the production fluid radially downward to create a vortex that is used to add in the removal of particulate matter from the fluid mixture of the production fluid by forcing particulate matter downward and outward relative to the fluid mixture. A bottom portion of the fin (68) then has an opening (69) to collect the separated particulate matter. The fin (68) may comprise a flange (67) extending upwardly downstream of the opening (69) to aid in collecting the separated particulate matter into the opening (69).

The bypass (70) is then coupled with the inner tube (60) at the opening (69) and extends downwardly within the conduit (57) of the outer tube (56) such that the bottom end (74) of the bypass is positioned downward from the bottom end (64) of the inner tube (60). Accordingly, the particulate matter may enter the opening (69) and flow through the bypass (70) to below the bottom end (64) of the inner tube (60) such that the particulate matter is inhibited from entering the inner tube (60) and the pump intake. The particulate matter may then exit the bypass (70) at the bottom end (74) of the bypass (70) and flow downward out of the bottom end (59) of the outer tube (56) to a mud anchor (90). In the illustrated embodiment, the bypass (70) has a generally tubular shape, but any other suitable shape may be used.

Figure 5:
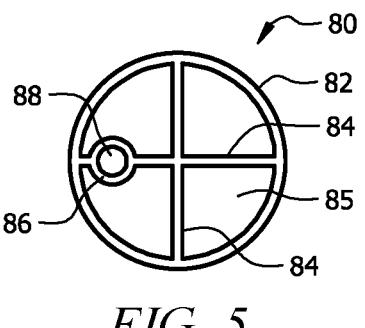
FIG. 5 depicts a cross-sectional view of the separator of FIG. 4 taken along line 5-5 of FIG. 4.

The separator (50) further comprises a bypass coupling (80) that is configured to stabilize the bypass (70) within the separator (50). As best shown in FIG. 5, coupling (80) comprises an outer annular ring (82) that may be coupled with an interior surface of the outer tube (56). The coupling (80) further comprises a pair of supports (84) that extend transversely relative to each other within the outer annular ring (82). Supports (84) thereby form openings (85) within the outer annular ring (82) between the supports (84). An inner annular ring (86) may then be positioned on one of supports (84) to form an opening (88) within the inner annular ring (86) that is sized to receive a bottom portion of the bypass (70) therethrough. The coupling (80) may thereby stabilize the bottom portion of the bypass (70) relative to the outer tube (56). Still other suitable configurations for separator (50) will be apparent to one with ordinary skill in the art in view of the teachings herein.

In use, the separator (50) may be positioned within a casing (23) of a wellbore (11) of a hydrocarbon production well to separate particulate matter from a production fluid mixture and direct the separated particulate matter away from a pump intake to thereby inhibit the particulate matter from entering the pump intake, which may increase the efficiency and/or the service life of the downhole assembly. For instance, FIG. 6 shows a method (100) of operating the separator (50) to separate particulate matter from a production fluid mixture. The method (100) comprises a step (102) of drawing a fluid mixture into a separator (50) having an outer tube (56) and an inner tube (60), the outer tube (56) including slots (58) positioned above a pump intake at a bottom end (64) of the inner tube (60), the slots (58) allowing the fluid mixture to enter a channel (66) between the outer tube (56) and the inner tube (60). The flow path of the fluid mixture entering the separator (50) through slots (58) is shown by arrows (90) in FIG. 4. As described above, the fluid mixture may contain liquid and/or gaseous products, as well as solid particulates such as sand.

The method (100) shown in FIG. 6 further comprises a step (104) of causing the fluid mixture to flow downward toward the pump intake (64), wherein the fluid mixture reaches a downward velocity sufficient to allow the particulate matter in the fluid mixture to separate from the fluid mixture as the fluid mixture is drawn into the inner tube (60) through the pump intake (64). The fluid mixture may flow downward within the channel (66), as shown by arrows (91) in FIG. 4, due to gravitational forces. In the illustrated embodiment, the production fluid mixture is also directed radially by fin (68) as shown by arrows (92). The downward and/or radial forces caused by fin (68) may aid the particulate matter within the production fluid to separate from the liquid and/or gaseous matter by forcing the heavier solid particulate matter outwardly and downwardly relative to the liquid and/or gaseous matter of the fluid mixture. Accordingly, the separated liquid and/or gaseous matter of the fluid mixture may be drawn into the pump intake (64) as shown by arrows (96).

The method (100) shown in FIG. 6 further comprises a step (106) of directing the separated particulate matter through a bypass (70) to downstream of the pump intake (64). For instance, once the separated particulate matter is separated from the fluid mixture, the separated particulate matter may be directed to opening (69) such that the separated particulate matter flows into the opening (69) and through the bypass (70) as shown by arrow (93) in FIG. 4. The separated particulate matter may then exit the bypass (70) at the bottom end (74) of the bypass (70) downstream of the pump intake as shown by arrow (94). The separated particulate matter may then exit the separator (50) at the bottom end (59) of the outer tube (56) where gravitational forces may direct the separated particulate matter downward to a mud anchor (90) as shown by arrow (95). Accordingly, the bypass (70) is configured to direct the separated particulate matter away from the pump intake (64) to thereby inhibit the separated particulate matter from entering the pump intake (64). Openings (85) of the coupling (80) may also allow liquid and/or gaseous product to flow through the coupling (80) if needed. Still other suitable methods for separating particulate matter from a fluid production stream will be apparent to one with ordinary skill in the art in view of the teachings herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A particulate separator for use with a production well producing a fluid mixture including particulate matter, the particulate separator comprising:
   an outer tube including an opening extending from an exterior of the outer tube to an interior of the outer tube, wherein the fluid mixture flows from the exterior of the outer tube to the interior of the outer tube through the opening;
   a pump intake positioned in the interior of the outer tube, wherein the fluid mixture flows from the opening to the pump intake; and
   a bypass tube configured to direct the particulate matter in the fluid mixture downward to below the pump intake to thereby inhibit the particulate matter in fluid mixture from entering the pump intake.

2. The particulate separator of claim 1, further comprising an inner tube, the inner tube at least partially in the outer tube and having a bottom end comprising the pump intake.

3. The particulate separator of claim 2, wherein:
   the inner tube comprises a helical fin extending outwardly and downwardly from the inner tube,
   the helical fin is positioned between the opening and the pump intake, and
   the helical fin is configured to direct the fluid mixture radially downward to aid in removal of the particulate matter from the fluid mixture and comprises an opening at a bottom portion of the helical fin such that the helical fin is configured to direct the particulate matter separated from the fluid mixture into the opening.

4. The particulate separator of claim 3, wherein a top end of the bypass tube is coupled with the opening.

5. The particulate separator of claim 3, wherein the helical fin comprises a flange extending upwardly adjacent to the opening to direct the particulate matter separated from the fluid mixture into the opening.

6. The particulate separator of claim 2, further comprising:

a fin extending outward from the inner tube to an interior surface of the outer tube.

7. The particulate separator of claim 6, wherein an inlet of the bypass tube is configured to collect the particulate matter from the fin.

8. The particulate separator of claim 1, further comprising a coupling positioned at a bottom portion of the bypass tube, wherein the coupling is configured to couple the bottom portion of the bypass tube with the outer tube to stabilize the bottom portion of the bypass tube.

9. The particulate separator of claim 8, wherein:

the coupling comprises an outer annular ring and one or more supports extending within the outer annular ring, the outer annular ring is coupled with the outer tube, the coupling comprises an inner annular ring positioned within the outer annular ring, and the inner annular ring is sized to receive the bottom portion of the bypass tube therethrough.

10. The particulate separator of claim 8, wherein the coupling comprises one or more openings configured to allow the fluid mixture to flow therethrough.

11. The particulate separator of claim 1, wherein an exit of the bypass tube is positioned above an open bottom end of the outer tube, wherein the open bottom end of the outer tube is configured to allow the particulate matter exiting the bypass tube to flow to a mud anchor.

12. The particulate separator of claim 1, wherein the production well has an artificial lift mechanism.

13. The particulate separator of claim 1, further comprising:

a flange extending upwardly from an inlet of the bypass tube.

14. The particulate separator of claim 13, wherein the flange is configured to collect the particulate matter into the inlet of the bypass tube.

15. The particulate separator of claim 1, wherein the particulate matter in the fluid mixture is directed downward through an interior of the bypass tube to below the pump intake.

16. A method for separating particulate matter from a fluid mixture for use with a production well, the method comprising the steps of:

drawing the fluid mixture into a separator having an outer tube, the outer tube including one or more openings positioned above a pump intake positioned in the outer tube below the one or more openings, the one or more openings allowing the fluid mixture to enter the outer tube and flow toward the pump intake; and directing the particulate matter in the fluid mixture to travel downward from above the pump intake to below the pump intake and further directing the particulate matter into a bypass that has an exit below the pump intake, wherein the bypass inhibits the particulate matter from entering the pump intake.

17. The method of claim 16, further comprising an inner tube, the inner tube at least partially in the outer tube and having a bottom end comprising the pump intake.

18. The method of claim 17, wherein directing the fluid mixture to travel downward below the pump intake comprises directing the fluid mixture radially and downwardly by a fin extending outwardly from the inner tube above the pump intake.

19. The method of claim 16, wherein the particulate matter exiting the bypass is directed downwardly to a mud anchor.

20. The method of claim 16, wherein the production well has an artificial lift mechanism.

* * * * *